United States Patent [19]

Koike et al.

[11] 4,100,558

[45] Jul. 11, 1978

[54] AUTOMATIC-EXPOSURE CONTROL DEVICE FOR OPTICAL INSTRUMENTS

[76] Inventors: Hiroshi Koike, No. 5-10, 1-chome, Minami-Azabu, Minato-ku, Tokyo; Shoji Suzuki, No. 11-4-208, 4-chome, Minami-Dai, Sagamihara City, Kanagawa Prefecture; Takeki Asakawa, No. 3-2, 2-chome, Minami-Azabu, Minato-ku, Tokyo, all of Japan

[21] Appl. No.: 623,541

[22] Filed: Oct. 17, 1975

Related U.S. Application Data

[62] Division of Ser. No. 396,207, Sep. 11, 1973, Pat. No. 3,971,963.

[30] Foreign Application Priority Data

Sep. 14, 1972 [JP] Japan .................................. 47-92386

[51] Int. Cl.² .............................................. G03B 9/02
[52] U.S. Cl. ..................................... 354/271; 354/44; 352/141
[58] Field of Search .................. 354/40, 43, 44, 226, 354/228, 229, 230, 231, 232, 234, 235, 270, 271; 352/141

[56] References Cited

U.S. PATENT DOCUMENTS

| | | |
|---|---|---|
| 3,654,845 | 4/1972 | Fahlenberg et al. ................ 354/234 |
| 3,687,042 | 8/1972 | Mizui et al. ......................... 354/234 |
| 3,776,111 | 12/1973 | Maida ................................... 354/44 |

FOREIGN PATENT DOCUMENTS 2,159,152  5/1973  Fed. Rep. of Germany ....... 354/234

*Primary Examiner*—Russell E. Adams
*Attorney, Agent, or Firm*—Depaoli & O'Brien

[57] ABSTRACT

Herein disclosed is an electromagnetic rotary motion device including permanent magnets establishing a pair of spaced concentric and coextensive circular or semi-circular air gaps and a rotor unit including armatures which are movable in a circular path in and along the spaced air gaps in response to an electric control signal impressed thereon. A typical application of the rotary motion device is a diaphragm-assisted exposure control arrangement of an optical instrument, such as for example as a still camera, a cinema motion camera or a television camera, wherein the diaphragm is driven by the rotor unit for providing a degree of exposure which is optimum for the brightness of an object to be photographed or televised.

7 Claims, 4 Drawing Figures

AUTOMATIC-EXPOSURE CONTROL DEVICE FOR OPTICAL INSTRUMENTS

This is a division of application Ser. No. 396,207 filed Sept. 11, 1973, now U.S. Pat. No. 3,971,963.

BACKGROUND OF THE INVENTION

1. Field of the Invention

The present invention relates to electromagnetic rotary motion devices and has its general object to provide a device in which a movable member is electromagnetically driven in a circular path by a torque which is proportional or otherwise related to an electric control signal applied to the device.

2. Review of The Prior Art

The prior art diaphragm-assisted automatic exposure control device, incorporated in a cinema motion camera, for example, commonly uses a fixed permanent magnet and a coil which is rotatable thereon with a shaft drivingly connected to the diaphragm of the camera. The diaphragm is mechanically biased to a position to form a fully open aperture defined by diaphragm blades and is driven by the rotation of the coil on the permanent magnet so that the working area of the aperture in the diaphragm is varied by the angular displacement of the coil. The coil is connected to an external control circuit including photoelectrical transducer elements to produce an electrical signal which is representative of the brightness of an object to be photographed. The coil is thus energized with a current which is related to the brightness of the object so that the aperture in the diaphragm is set to be optimum for the particular brightness of the object. Numerous drawbacks have been pointed out as inherent in the exposure control device of this nature, including the insufficient density of the magnetic fluxes acting on the coil and the limited allowance for the angular displacement of the coil on the permanent magnet.

To cope with the limited angular displacement of the coil, for example, it has been an ordinary practice to have the diaphragm blade driven at a point considerably remote from the principal axis of a lens system of the camera for amplifying the angular displacement of the diaphragm blade. This results in unstable and unbalanced movement of the diaphragm blades and in a tendency of an excessive braking torque being applied to the blades when the blades are being brought to a standstill. Difficulties are, moreover, encountered in totally enclosing the exposure control device of the above described construction, so that the coil on the permanent magnet is subject to an influence of an external magnetic field, if any, and to an ingress of dust and moisture which are responsible for the deterioration of the performance of the exposure control device.

The image pick-up tube of the television camera or video telephone, on the other hand, uses a faceplate of a light sensitive film which is susceptible to mechanical shocks and contact so that the diaphragm should be operable not only to control the quantity of light to be admitted to the tube but to protect the faceplate from such mechanical shocks and contact. Thus, the diaphragm-assisted exposure control device for use in the television camera or video telephone commonly uses a servo motor so that the rotational motion achieved in the motor is carried transmitted to the diaphragm. By reason of the particular construction and principle of operation of the servo motor, however, it is practically impossible to have the rotational motion of the motor directly transmitted to the diaphragm without aid of reduction gears or any other mechanical power transmission means.

The provision of such mechanical transmission means, and also of a considerably intricate electrical control arrangement which is usually required for the servo motor, has been not only a major impediment to reducing the overall dimensions of the exposure control device but a cause of objectionable friction and play which are responsible for the deficient response of the exposure control device to an input electrical signal. Another drawback inherent in the exposure control device using the servo motor is that the servo motor has an axis of rotation which is not aligned with a principal axis of the lens system of the television camera or video telephone so that unbalanced and unstable movement of the diaphragm blades result, similarly to the exposure control devices for the still or cinema motion cameras. Restrictions are, moreover, met in achieving sufficient magnetic fluxes due to the particular configuration of the exposure control device using the servo motor so that only a limited amount of driving torque is available to the servo motor.

SUMMARY OF THE INVENTION

The present invention contemplates provision of a new electromagnetic rotary motion device which is advantageously applicable to the diaphragm-assisted automatic exposure control arrangement of the named optical instruments so as to overcome all the above mentioned drawbacks that are inherent in the prior art exposure control devices.

Briefly, the present invention provides an electromagnetic rotary motion device which is adapted to impart a rotational torque to a generally cylindrical structure which may be a structure carrying therein a lens system of an optical instrument having an automatically controlled diaphragm. More specifically, the present invention provides an electromagnetic rotary motion device which generally comprises stationary magnetic flux generating means formed with at least one arcuately curved continuous air gap concentric with the cylindrical structure and establishing a substantially uniform magnetic field flowing in a direction parallel to an axis of the cylindrical structure through the air gap, armature means concentric with the flux generating means and rotatable along the air gap about the axis of the cylindrical structure through an angle substantially proportional to a d.c. current applied to the armature means, and means interconnecting the armature means and the cylindrical structure for transmitting the rotation of the armature means to the cylindrical structure.

While the electromagnetic rotary motion device to be disclosed herein may find various other practical applications, the device will be described, by way of example, to be utilized particularly for the driving of a diaphragm of exposure control means of an optical instrument such as a still or cinema motion camera or an image pick-up tube of a television camera or a video telephone. Thus, the present invention has as its further object to provide an improved exposure control device of such an optical instrument using a diaphragm which is automatically or electomagnetically controlled responsive to the brightness of an object to be photographed or televised.

BRIEF DESCRIPTION OF THE DRAWINGS

The natures and advantages of the electromagnetic rotary motion device according to the present invention will become more apparent from the following detailed description of the invention taken in conjunction with the accompanying drawings, in which.

DESCRIPTION OF THE PREFERRED EMBODIMENT

Before entering into detailed discussion with reference to the drawings, it may be noted that, although the electromagnetic rotary motion device according to the present invention will be shown and described as being incorporated into a diaphragm-assisted exposure control device and although, furthermore, the exposure control device will be shown and described as being installed on the optical instrument of a specific construction, such are merely by way of example, and thus the electromagnetic rotary motion device may be used for any other purposes and the diaphragm-assisted exposure control device may be incorporated in an optical instrument of any other configuration.

Figure 1:
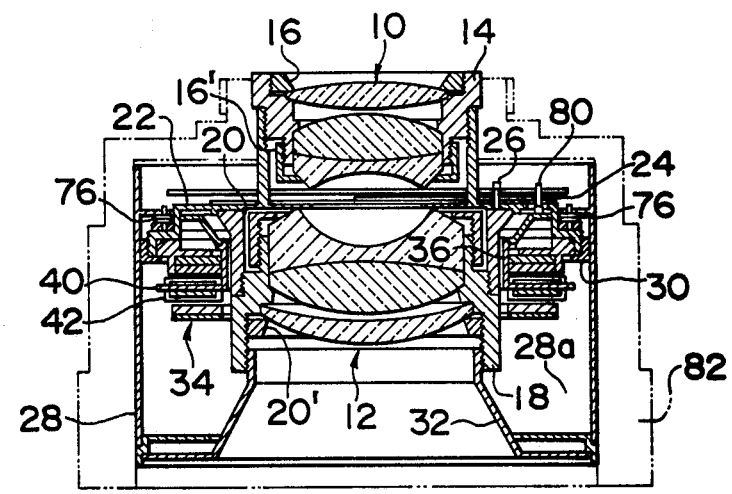
FIG. 1 is a diametrical sectional view showing an optical instrument incorporating an example of the exposure control device using a preferred embodiment of the rotary motion arrangement according to the present invention.

Reference will now be made to the drawings, FIGS. 1 to 4. As seen in FIG. 1, the optical instrument is herein exemplified as having first and, second lens systems 10 and, 12, respectively, having principal axes which are in line with each other. The first lens system 10 is positioned within a first generally cylindrical housing 14 and is tightly held in position by means of threaded outer and inner retainer rings 16 and 16', respectively, which are screwed to the cylindrical housing 14. Likewise, the second lens system 12 is encased within a second generally cylindrical housing 18 and is held in position by means of threaded inner and outer retainer rings 20 and 20', respectively, which are screwed to the cylindrical housing 18. The first and second cylindrical housings 14 and 18, respectively, are fast on an annular flange 22 which is interposed therebetween. This annular flange 22 is rigidly connected to or integral with the second cylindrical housing 18 and extends radially inwardly from the adjacent inner peripheral edge of the housing 18, defining a circular opening between the first and second lens systems 10 and 12, respectively. A suitable number of diaphragm blades 24 interlaying each other on their overlapping portions are rotatable on this annular flange 22 about pivotal pins 26 which are anchored to the flange 22. The diaphragm blades 24 have edges which are so contoured or configured as to form therebetween an aperture having an area which is variable as the diaphragm blades 24 are caused to simultaneously turn about their respective pivotal pins 26. The first cylindrical housing 14 is formed with elongated slots (not shown) through which the individual diaphragm blades 24 are movable relative to the housing 14. The arrangement of the diaphragm per se is well known in the art and is rather immaterial for the understanding of the features of the device according to the present invention so that no further discussion thereof will be herein incorporated for brevity of description.

The optical unit, which is thus made up of the lens systems 10 and 12, cylindrical housings 14 and 18 and diaphragm blades 24, is supported on a cylindrical casing 28 by means of an annular locking ring 30 which rigidly connects the annular flange 22 to the cylindrical wall of the casing 28 (as will be better seen in FIG. 2) and an annular end plate 32 which rigidly connects the second cylindrical housing 18 to the circumferential edge of the casing 28. The cylindrical casing 28 thus defines, between an inner face thereof and the second cylindrical housing 18, an annular chamber 28a which is substantially concentrical with the lens systems 10 and 12 and the cylindrical housings 14 and 18.

Figure 2:
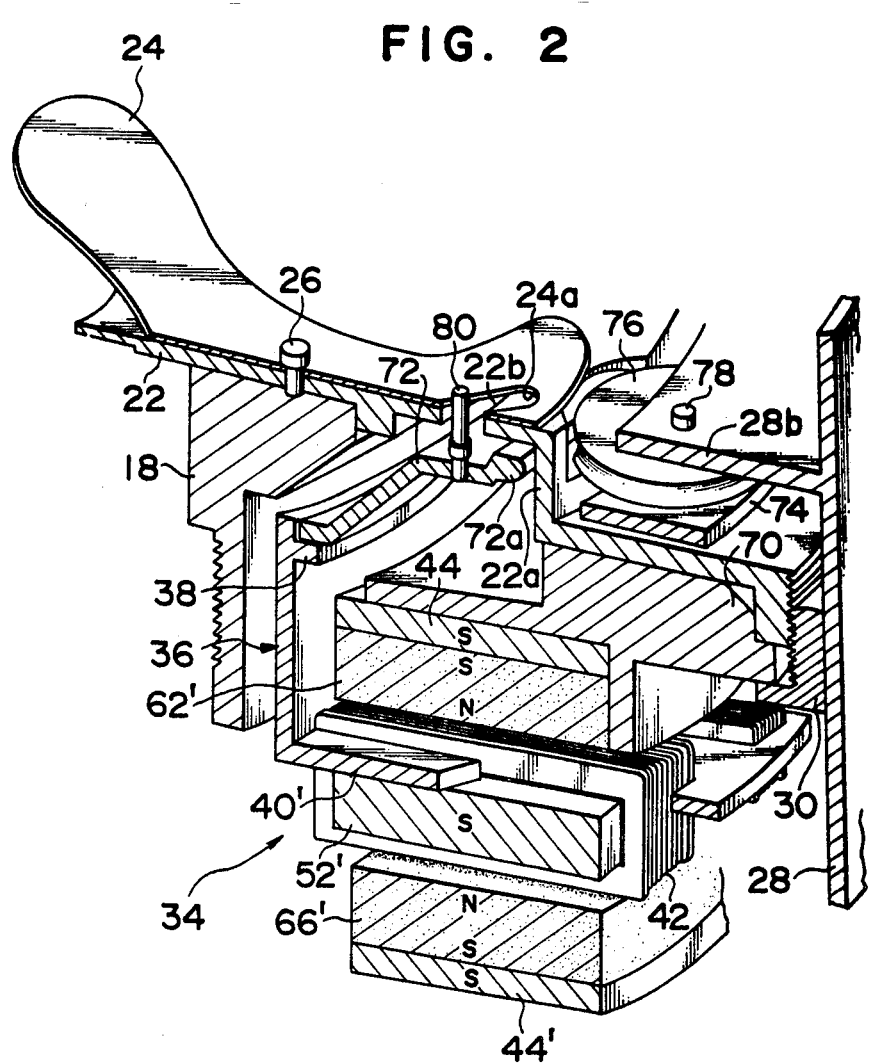
FIG. 2 is a fragmentary cut-away view showing, on an enlarged scale, the rotary motion arrangement forming part of the exposure control device illustrated in FIG. 1.

The diaphragm blades 24 incorporated in the optical instrument thus constructed are driven to rotate about pivotal pins 26 by an electromagnetic rotary motion arrangement which is designated generally in FIGS. 1 and 2 by reference numeral 34. This rotary motion arrangement 34 consists essentially of a stator unit providing magnetic flux generating means adapted to establish a magnetic field through a pair of spaced yet substantially coextensive circular air gaps and a rotor unit which provides armature means movable in a substantially circular path through the air gaps thus established by the stator unit.

Figure 3:
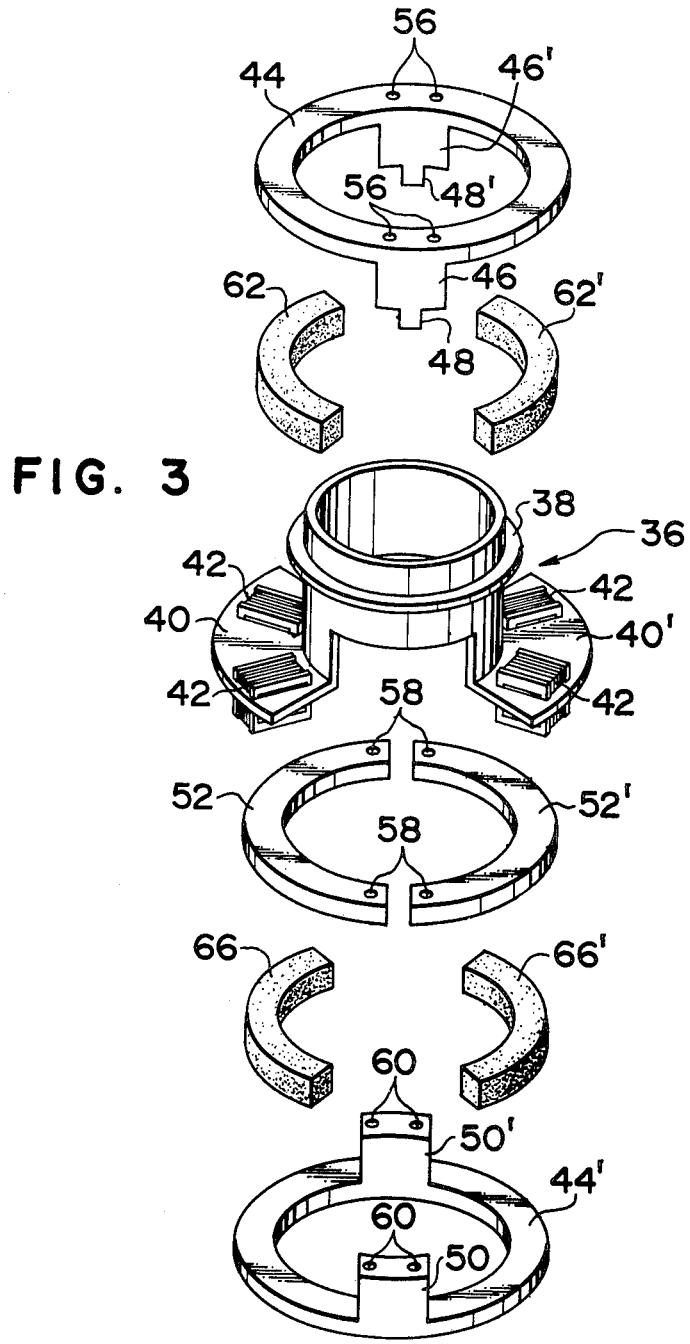
FIG. 3 is an exploded perspective view showing the rotary motion arrangement in a disassembled form.

The rotor unit comprises, as will be best seen in FIG. 3, a bored non-magnetic cylinder 36 having an annular flange 38 formed adjacent one axial end thereof and a pair of flanges 40 and 40' which are formed at the other end of the cylinder 36. These flanges 40 and 40' are substantially diametrically opposed to each other across one end of the axial bore in the cylinder 36 and extend radially outwardly from the circumferential edge of the cylinder 36. A suitable number of armatures 42, herein shown as two in number, are mounted on each of the flanges 40 and 40' through spaced openings formed in each of the flanges 40, 40' and respectively have coils which are wound substantially in parrallel to the radial directions of the flanges 40, 40'. The coils of all the armatures 42 have the same number of turns and the armatures 42 on one flange 40 are spaced apart from each other a distance which is preferably substantially equal to the distance between the armatures 42 on the other flange 40'. Each of the armatures 42 is secured to the flange in such a manner that the coil has its portions extending in the radial direction of the flange and projecting outwardly (viz., upwardly and downwardly as seen in FIGS. 2 and 3) from the opening receiving the armature 42. Thus, the radially extending portions of each coil have defined therebetween an elongated opening which is located on one side (shown as an underside in FIGS. 2 and 3) of the flanges 40, 40'.

The stator unit, on the other hand, comprises first and second annular outer pole pieces 44 and 44', respectively, which are axially spaced apart from and in parallel to each other and which have substantially identical radii of curvature. The first outer pole piece 44 has formed on one annular face thereof a pair of substantially diametrically opposed projections 46 and 46' which are directed in parallel to the central axis of the pole piece 44. These projections 46 and 46' are formed with lands 48 and 48', respectively, at their leading ends. Likewise, the second outer pole piece 44' has formed on one face thereof a pair of substantially diametrically opposed projections 50 and 50' which are directed toward the projections 46 and 46', respectively, of the first outer pole piece 44.

Figure 4:
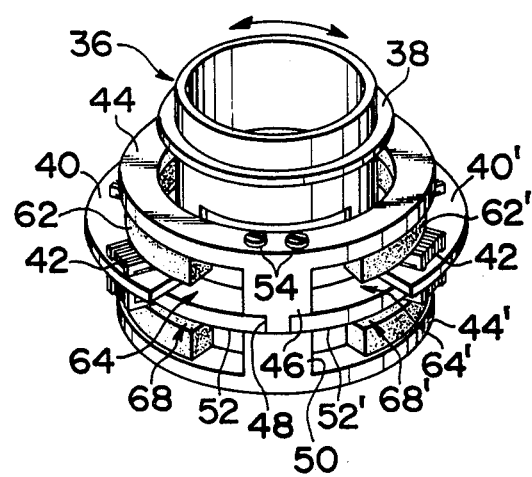
FIG. 4 is a perspective view showing the rotary motion arrangement in an assembled form.

In an assembled form which is illustrated in FIG. 4, the pole pieces 44 and 44' are securely connected to each other with the lands 48 and 48' of the projections 46 and 46' of the first outer pole piece 44 in abutting engagement with the projections 50 and 50', respectively, of the second outer pole piece 44'. A pair of substantially semicircular split intermediate pole pieces 52 and 52' are positioned between the outer pole pieces 44 and 44' and are connected thereto with their end portions interposed between the projections of the outer pole pieces 44 and 44'. The split intermediate pole pieces 52 and 52' thus form across the lands 48 and 48' a single annulus which is substantially concentrical with the two outer pole pieces 44 and 44' and which has a radius of curvature which is substantially common to those of the outer pole pieces. The pole pieces 44, 44', 52 and 52' are assembled together by means of screws 54 (FIG. 4) which are received in screw holes 56, 58 and 60 (FIG. 3) formed in the first outer pole piece 44, the split intermediate pole pieces 52 and 52' and the second outer pole piece 44', respectively.

The stator unit further comprises a first pair of substantially semi-circular permanent magnets 62 and 62' of, for example, ferite which are bonded or otherwise secured to inner semicircular faces, isolated from each other by the projections 46 and 46', of the first outer piece 44. These split permanent magnets 62 and 62' establish constant magnetic fields in diametrically opposed semi-circular air gaps 64 and 64' which (FIG. 4) are uniformly formed between the first outer pole piece 44 and the split intermediate pole pieces 52 and 52', respectively.

A second pair of substantially semi-circular split permanent magnets 66 and 66' are bonded or otherwise fastened to inner semi-circular faces, also isolated from each other by the projections 50 and 50', of the second outer pole piece 44'. These split permanent magnets 66 and 66' establish a magnetic field in diametrically opposed semi-circular air gaps 68 and 68' (FIG. 4) which are uniformly formed between the split intermediate pole pieces 52 and 52', respectively, and the second outer pole piece 44'. The first pair of permanent magnets 62 and 62' and the second pair of permanent magnets 66 and 66' are so positioned that like field poles appear at their inner surfaces which are in vis-a-vis relation to each other, the like field poles being herein assumed to be N-poles as indicated in FIG. 2. With the N-poles thus appearing at the inner surfaces of the first and second pairs of permanent magnets, S-poles appear at outer surfaces of the individual permanent magnets and accordingly in the first and second outer pole pieces 44 and 44' and in the intermediate pole pieces 52 and 52'. Constant magnetic paths will be in this manner established through the first pair of permanent magnets 62 and 62', first and second outer pole pieces 44 and 44', respectively, and the split intermediate pole pieces 52 and 52'.

The rotor unit having the construction previously described is combined with the stator unit in such a manner that the flanges 40 and 40' of the cylinder 36 extend intermediate between the permanent magnets 62 and 62' and the associated split intermediate pole pieces 52 and 52', respectively, and that each of the armatures 42 carried on the flanges 40 and 40' has one of its radially extending portions positioned intermediate between the first outer pole piece 44 and the intermediate pole piece 52 to 52' and the other of such portions positioned intermediate between the intermediate pole piece 52 or 52' and the second outer pole piece 44', as seen in FIGS. 2 and 4. Thus, the intermediate pole pieces 52 and 52' extend through the radially elongated openings formed in the individual armatures 42 so that the rotor unit as a whole is free to move in a circular path with one radially extending portion of each armature movable in and along the first air gap 64 or 64' and the other radially extending portion of the armature movable in and along the second air gap 68 or 68', respectively.

The stator unit is secured to the annular flange 22 of the second cylindrical housing 18 and accordingly to the casing 28 through an annular mounting member 70 of a non-magnetic rigid material so that the stator unit is held stationary relative to the casing 28 and the optical unit carried by the casing. It is, in this instance, important that all the annular and semicircular members making up the stator unit are positioned substantially concentrically around an adjacent wall portion of the second cylindrical housing 18 and have inside diameters that will provide an annular spacing between the adjacent wall portion of the housing 18 and the stator unit in its entirety, as seen in FIG. 2.

The cylinder 36 of the rotor unit is securely connected through its flange 38 to an annular supporting plate 72 having a circular outer peripheral edge 72a positioned below the annular flange 22. As seen in FIG. 2, this annular flange 22 has its outer peripheral portion stepped inwardly toward the stator unit through an annular wall portion 22a which extends in proximity to the outer peripheral edge 72a of the annular supporting plate 72. The casing 28 has an inner flange 28b which is spaced apart from the downwardly stepped outer peripheral portion of the annular flange 22 while an annular bearing plate 74 is positioned on an upper face of this downwardly stepped portion of the flange 22. A suitable number of grooved wheels 76 are rotatable between the annular flange 28b of the casing 28 and the bearing plate 74 through and about shafts 78 which are received in the flange 28b and bearing plate 74. These wheels 76 are held in contact with the outer peripheral edge 72a of the annular supporting plate 72 through apertures formed in the annular wall 22a forming part of the flange 22. The wheels 76 thus receive in their grooved peripheral edges the circular peripheral edge 72a of the annular supporting plate 72 so that the supporting plate 72 and accordingly the rotor unit as a whole are supported by the wheels 76 in a manner to be rotatable around the second cylindrical housing 18. It is, in this instance, important that the cylinder 36 is so sized in diameter as to be free to move between and along the annular spacing between the adjacent wall portion of the second housing 18 and the stator unit surrounding the cylinder 36 as seen in FIG. 2.

Guide pins 80 are anchored to the annular supporting plate 72 and extend upwardly through arcuate slots 22b formed in the annular flange 22 and through cam slots 24a which are formed in outer end portions of the individual diaphragm blades 24 so that the diaphragm blades 24 are driven to turn about their pivotal pins 26 when the cylinder 36 of the rotor unit is rotated about its axis and accordingly the guide pins 80 are moved through the arcuate slots 22b and the cam slots 24a in the diaphragm blades 24.

The coils of the armatures 42 of the rotor unit are connected to suitable light-sensitive control signal generating means adapted to produce an electrical control signal which is related to the brightness responded to by such means. The light-sensitive control signal generating means may use photoelectric elements which are adapted to produce an output current proportional to the brightness thereby detected. When, thus, the diaphragm blades 24 are in positions providing an aperture having an area which is optimum for the brightness detected by the control signal generating means, the coils of the armatures 42 will remain de-energized so that the rotor unit is maintained at rest for holding the diaphragm blades 24 in situ. When, however, the effective area of the aperture formed by the diaphragm blades 24 is either excessive or deficient for the detected brightness, then the light senstive control signal generating means will supply control current of an intensity which is predetermined to move the diaphragm blades 24 into positions providing an optimum degree of exposure for the detected brightness. The coils of the armatures 42 are wound in the radial directions of the air gaps 64, 64', 68 and 68' as previously noted so that the radially extending portions of the coils cut across the magnetic flux flowing through the air gaps. When, thus, the coils of the armatures 42 are energized from the light-sensitive control signal generating means, the individual armatures 42 undergo a force which is developed in circumferential directions of the air gaps, viz., in directions transverse to the direction of the flux in the air gaps so that the rotor unit as a whole moves along the air gaps about the central axis of the rotor unit through a central angle which is appropriate to drive the diaphragm blades 24 into the optimum positions through the annular supporting plate 72 and guide pins 80. The rotational movement of the rotor unit will terminate as soon as the optimum working area is achieved by the aperture formed by the diaphragm blades 24 so that the light-sensitive control means de-energize the coils of the armatures 42.

The entire structure of the optical instrument constructed and arranged in the manner above described may be totally enclosed in a casing 82 which is dust and moisture proof, as indicated by phantom lines in FIG. 1.

Although the rotor unit has thus far been assumed to have two outer flanges 40 and 40' carrying the armatures 42 thereon, such is merely by way of example and, where desired, only one or even more than two of such flanges may be formed on the cylinder 36 of the rotor unit. In this instance, each of the outer pole pieces 44 and 44' should have projections which are in agreement in number to the flanges on the cylinder 36 and, moreover, the configurations of the permanent magnets and the intermediate pole pieces of the stator unit should be varied accordingly.

It will now be appreciated from the foregoing description that significantly simplified construction can be achieved for the exposure control device because the rotor and stator units having the generally annular configurations are positioned substantially concentrically around the cylindrical structure accommodating, for example, the optical unit and because the rotor unit is adapted to transmit its driving effort to the driven members such as the diaphragm blades without resort to involvement of any mechanical power transmission means having an intricate construction. In the absence of such intricately constructed power transmission means, the exposure control device herein disclosed is substantially free from objectionable friction and play that would otherwise be responsible for the deteriorated response characteristics of the driven members such as the diaphragm blades. The exposure control device and accordingly the electromagnetic rotary motion device forming part of the exposure control device may be said to feature not only the simplified constructions but the improved response characteristics to the input electrical signals which may be extremely small current. The rotor unit has the central axis which is aligned with the axis of the cylindrical structure or with the principal axis of the lens system so that the diaphragm blades or any other forms of driven members can be driven in a sufficiently stable and balanced condition. Since, moreover, the magnetic path across the spaced first and second pairs of permanent magnets is shunted by the intermediate pole pieces, first and second identical air gaps are formed on both sides of the intermediate pole pieces so that the coils of the armatures of the rotor unit link an increased number of fluxes with the resultant increase in the driving torque imparted to the armatures when the coils are energized.

What is claimed is:

1. A diaphragm-assisted exposure control device, comprising
   A. a stationary inner support member (22), constructed from a non-magnetic material, which is formed with a circular opening having a center axis therethrough;
   B. a plurality of diaphragm blades (24) which are arranged substantially symmetrically about said center axis and are rotatable about respective axes which are substantially parallel with said center axis, whereby said diaphragm blades are capable of forming therebetween a variable-area aperture having an area which is optimum for the brightness detected by a control signal generating means and having a center axis substantially in line with the center axis of said opening, each said diaphagm blade having a cam slot therein;
   C. a stator unit concentrically positioned externally of said inner support member and comprising:
      (1) first and second annular outer pole pieces (44 and 44'), disposed so as to be axially spaced apart from and parallel with each other, said pole pieces having identical radii of curvature and inner pole surfaces in axially opposed relationship,
      (2) first and second semi-circular permanent magnets (62 and 66, 62' and 66'), having:
         (a) outer magnet surfaces which are attached to said inner pole surfaces, and
         (b) first and second inner magnet surfaces which are axially spaced apart in opposed relationship and said identical radii of curvature, and
      (3) an intermediate pole piece (52, 52') which:
         (a) is disposed approximately between and in parallel to said first and second pairs of permanent magnets, and
         (b) is spaced sufficiently far apart from said inner magnet surfaces so as to form first and second air gaps therebetween so that a magnetic field is established across said air gaps and like field poles appear at said inner magnet surfaces and opposite like field poles appear at said outer magnet surfaces, in said first and second outer pole pieces, and in said intermediate pole piece, D. a stationary outer support member (70), constructed from a non-magnetic material, which holds said stator unit in position concentrically and externally of said inner support member;
E. a rotor unit, comprising;
   (1) a bored non-magnetic cylinder (36) having a flange (40, 40') extending radially outwardly from one circumferential edge thereof and an opening formed in said flange, and
   (2) an armature (42, 42') mounted in said flange within said opening and having the coil thereof wound so that portions extend axially and radially to define an arcuately disposed opening which is located on one side of said flange;
F. a rotatable support member (72) supporting said rotor unit concentrically and externally of said inner support member and rotatably about the center axis of said opening in the inner support member, said intermediate pole piece being disposed within said arcuately disposed opening without contacting said coils throughout the range of rotation of said rotor unit; and
G. pins (80) projecting from said rotatable support member respectively into said cam slots substantially in parallel with said center axis of said opening in said inner support member.

2. An exposure control device as set forth in claim 1, in which said first and second semi-circular permanent magnets are each in pairs and said intermediate pole piece is split to form a pair of semi-circular intermediate pole pieces.

3. An exposure control device as set forth in claim 2, in which said first and second annular outer pole pieces each further comprise a pair of substantially diametrically opposed projections which axially extend form said inner pole surfaces for a distance equalling the axial thickness of said first and second permanent magnets.

4. An exposure control device as set forth in claim 3, in which each projection of one pair of said projections has a centrally disposed land extending axially and inwardly from the inner surface thereof, each said land having an axially measured length equalling the axial thickness of said intermediate pole piece and arcuately measured width equalling the difference between the arcuately measured length of one of said pair of semi-circular intermediate pole pieces and 180°.

5. An exposure control device as set forth in claim 4, in which said first and second annular pole pieces have screw holes extending through said projections; said semi-circular intermediate pole pieces have screw holes disposed to be in alignment therewith; and a pair of screws rigidly conjoin said first and second annular outer pole pieces and said pair of semi-circular intermediate pole pieces to form a rigid stator unit.

6. An exposure control device as set forth in claim 5, in which said rotor unit further comprises an annular flange to which said rotatable support member is secured.

7. An exposure control device as set forth in claim 6, in which said rotatable support member has a circular outer peripheral edge and in which said stator unit is rigidly attached to a cylindrical housing and said rotatable support member is rotatably supported by a plurality of grooved wheels which engage said circular peripheral edge and are rotatably supported by said cylindrical housing.

* * * * *